US006878466B1

(12) United States Patent
Lange et al.

(10) Patent No.: US 6,878,466 B1
(45) Date of Patent: Apr. 12, 2005

(54) METHOD FOR IMPROVING THE RELIABILITY OF BRITTLE MATERIALS THROUGH THE CREATION OF A THRESHOLD STRENGTH

(75) Inventors: Frederick F. Lange, Santa Barbara, CA (US); Masa P. Rao, Isla Vista, CA (US); Antonio Javier Sanchez Herencia, Madrid (ES)

(73) Assignee: The Regents of the University of California, Oakland, CA (US)

( * ) Notice: Subject to any disclaimer, the term of this patent is extended or adjusted under 35 U.S.C. 154(b) by 449 days.

(21) Appl. No.: 09/670,918

(22) Filed: Sep. 29, 2000

(51) Int. Cl.[7] .......................... B32B 15/04; B32B 7/00; B32B 7/02; B32B 18/00; B32B 27/00
(52) U.S. Cl. ...................... 428/686; 428/632; 428/212; 428/220; 428/213; 428/218; 428/409; 428/543; 428/627; 428/699; 428/702
(58) Field of Search ................................ 428/615, 621, 428/624, 627, 632, 633, 686, 68, 212, 220, 213, 218, 332, 337, 409, 410, 543, 699, 702

(56) References Cited

U.S. PATENT DOCUMENTS

| | | | | |
|---|---|---|---|---|
| 4,197,360 A | * | 4/1980 | Throop | 428/651 |
| 4,876,148 A | * | 10/1989 | Virkar | 428/384 |
| 5,591,287 A | * | 1/1997 | Clegg et al. | 156/89 |
| 6,489,036 B1 | * | 12/2002 | Sherman | 428/469 |

OTHER PUBLICATIONS

M.P. Rao, A.J. Sanchez–Herencia, G.E. Beltz, R.M. McMeeking, and F.F. Lange, "Laminar Ceramics That Exhibit A Threshold Strength," Science, Oct. 1, 1999, vol. 286, pp. 102–105.
Statement from M.P. Rao, A.J. Sanchez–Herencia, and F.F. Lange to Patent Examiner concerning a non–enabling oral presentation made on Apr. 28, 1999.

F. F. Lange, "Powder Processing Science and Technology for Increased Reliability," *J. Am. Ceram. Soc.* 72 [1], 3 (1989), no month.

D. J. Green, *Introduction to Mechanical Properties of Ceramics* (Cambridge Univ. Press, Cambridge, UK, 1998), no month.

(Continued)

Primary Examiner—Michael La Villa
(74) Attorney, Agent, or Firm—Fulbright & Jaworski

(57) ABSTRACT

Reliable, flaw-tolerant brittle materials are produced by incorporating layers under residual compression on the surface and throughout the bulk of the material that act to trap and contain the propagation of otherwise catastrophic cracking. The residual compression within these layers acts to reduce the stress intensity of the cracks, thereby causing them to arrest until further loading is provided. This highly desirable stable, subcritical crack growth mode persists with increased loading until the applied stress is large enough to drive the crack completely through compressive region, after which failure occurs. The exact level of stress needed to accomplish this is dictated by the architectural design of the compressive layers such that the material can be designed to have any minimum strength desired, within the limits of the materials system used. This results in a truncation of the strength distribution, such that there is virtually zero probability of failure below this minimum value, i.e. the material possesses a threshold strength. Consequently, sensitivity to flaws that would ordinarily cause catastrophic failure at stresses below the threshold strength is eliminated. Furthermore, the potential exists for the complete elimination of the strength variability, hence improving reliability, through the creation of nearly deterministic, i.e. single-valued, strengths by increasing the threshold strength above the stresses at which failure normally initiates from intrinsic flaws.

25 Claims, 17 Drawing Sheets

Schematic representation of the superimposed stress fields used to determine the stress intensity factor of the arrested crack. The left hand side shows a laminar ceramic composed of thin layers ($t_1$) subject to residual compressive stresses ($\sigma_c$) and thick layers ($t_2$) subject to tensile stresses ($\sigma_t$) all subjected to an applied tensile stress ($\sigma_a$). This laminate contains a slit crack of length 2a that extends into the compressive layers. The stresses shown on the left can be produced by the superposition of the two stress states shown on the right.

OTHER PUBLICATIONS

V. K. Pujari et al. "Reliable Ceramics for Advanced Heat Engines," *Am. Ceram. Soc. Bull.* 74 [4], 86 (1995), Apr.

D. J. Green and R. Tandon, V. M. Sglavo, "Crack Arrest and Multiple Cracking in Glass Through the Use of Designed Residual Stress Profiles," *Science* 283, 1295 (1999), Feb.

M. Oechsner, C. Hillman, and F. F. Lange, "Crack Bifurcation in Laminar Ceramic Composites," *J. Am. Ceram. Soc.* 79 [7], 1834 (1996), no month.

A. J. Sánchez–Herencia, C. Pascual, J. He, and F. F. Lange, "$ZrO_2$ /$ZrO_2$ Layered Composites for Crack Bifurcation," *J. Am. Ceram, Soc.*, 82 [6], 1512 (1999), no month.

A. J. Sánchez–Herencia, L. James, and F. F. Lange, "Bifurcation in Alumina Plates Produced by a Phase Transformation in Central, Alumina/Zirconia Thin Layers," *J. Eur. Ceram. Soc.*, 20 [9] 1295 (2000), no month.

M. P. Rao, A. J. Sánchez–Herencia, G. E. Beltz, R. M. McMeeking, and F. F. Lange, "Laminar Ceramics That Exhibit a Threshold Strength," *Science* 286, 102, (1999).

C. Hillman, Z. Suo, and F. F. Lange, "Cracking of Laminates Subjected to Biaxial Tensile Stresses," *J. Am. Ceram. Soc.* 79 [8], 2127 (1996), no month.

H. Tada, P. C. Paris, and G. R. Irwin, *The Stress Analysis of Cracks Handbook*, (Del Research Corp., St. Louis, MO, ed. 2, 1985), p. 5.13, no month.

R. M. McMeeking and Hbaieb K., "Optimal Threshold Strength of Laminar Ceramics," *Zeitshrift fuer Metalkunde*, 90 [12], 1031 (1999), Dec.

S. Ho, C. Hillman, F. F. Lange, and Z. Suo, "Surface Cracking in Layers Under Biaxial, Residual Compressive Stresses," *J. Am. Ceram. Soc.*, 78 [9] 1834–38 (1995), no month.

F.F.Lange, M.P.Rao, K.Hbaieb and R.M.McMeeking, "Ceramics that Exhibit a Threshold Strength," in Ceramic Armor Materials by Design, Ceramic Trans. 134, Ed. By J.W.McCauley, a.Crowsen, W.A. Gooch Jr., A.M.Rajendran, S. J. Bless, K.V.Logan, M.Normandia and S. Wax, Pub. By Am. Ceram. Soc., Westerville, OH, pp. 449–510, no date.

* cited by examiner

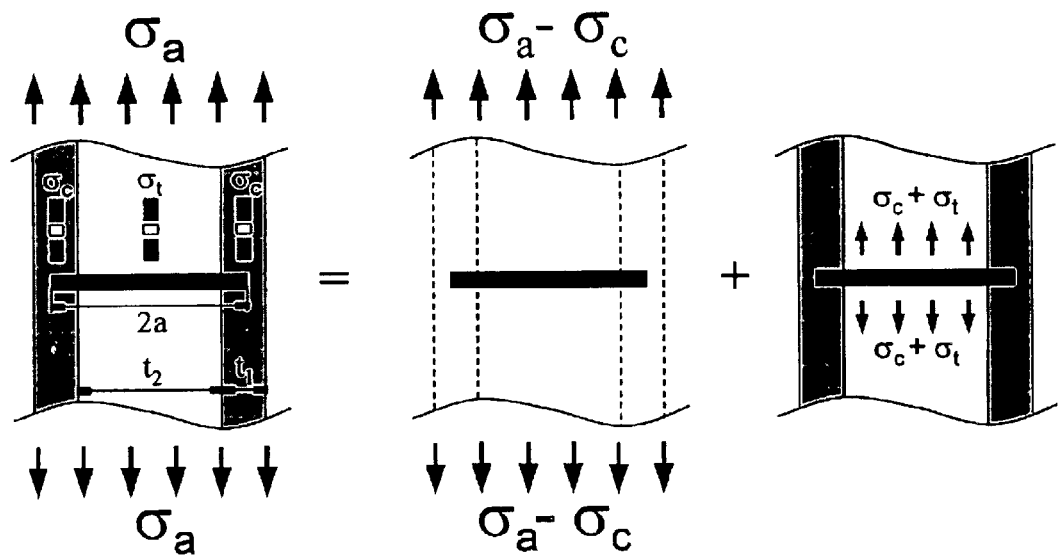

Fig. 1 Schematic representation of the superimposed stress fields used to determine the stress intensity factor of the arrested crack. The left hand side shows a laminar ceramic composed of thin layers ($t_1$) subject to residual compressive stresses ($\sigma_c$) and thick layers ($t_2$) subject to tensile stresses ($\sigma_t$) all subjected to an applied tensile stress ($\sigma_a$). This laminate contains a slit crack of length 2a that extends into the compressive layers. The stresses shown on the left can be produced by the superposition of the two stress states shown on the right.

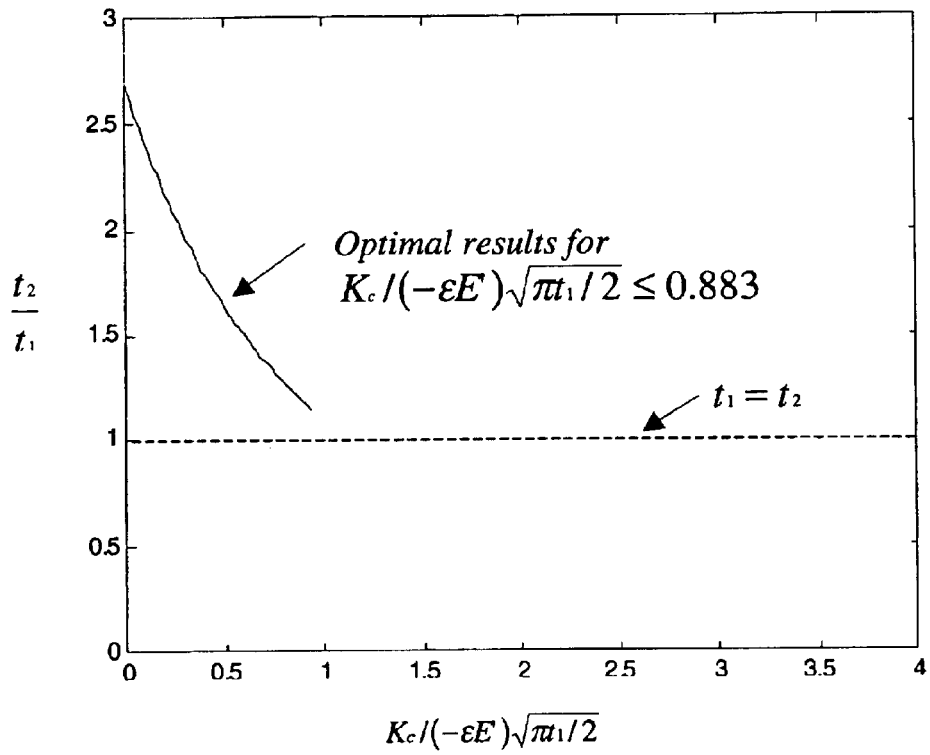

Fig. 2 Plot of the layer thickness ratio, $t_2/t_1$, that optimizes the threshold strength for a given fixed compressive layer thickness, $t_1$. When $K_c/(-\varepsilon E')\sqrt{\pi t_1/2} \leq 1$, the residual compression term dominates, therefore threshold strength is optimized when the tensile layer is a few times thicker than the compressive layer. When $K_c/(-\varepsilon E')\sqrt{\pi t_1/2} \geq 1$, the toughness term dominates, therefore threshold strength is optimized when the layer thicknesses are equal and chosen to be as thin as practically possible, as indicated by the dashed line.

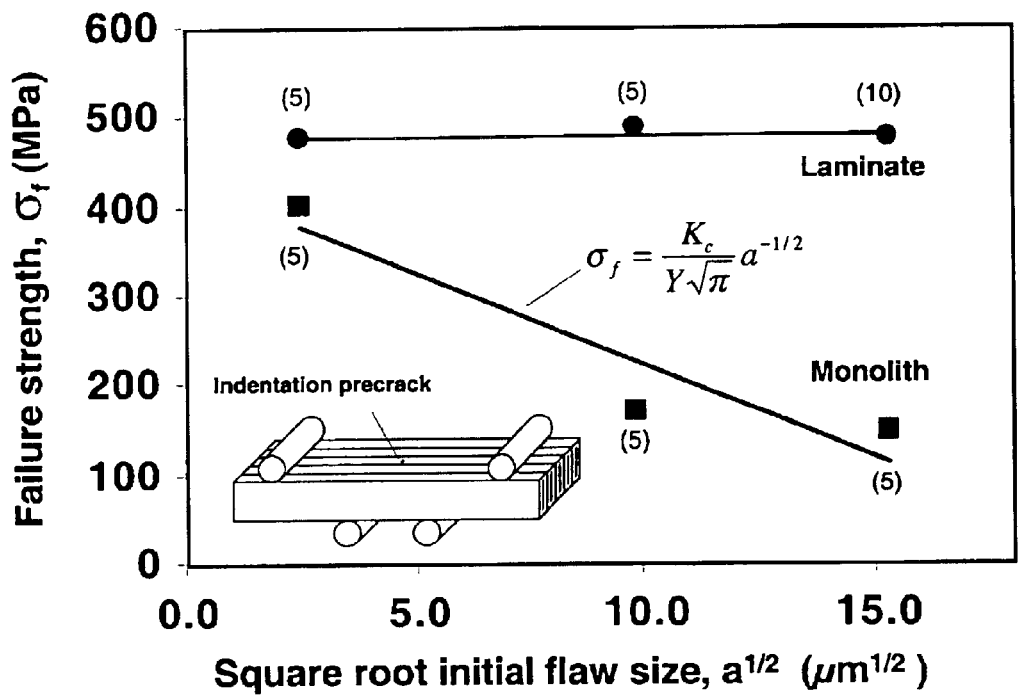
Fig. 3 Plot of the failure strength vs. the square root of the initial flaw size for both laminated and monolithic specimens, tested in the configuration shown in the inset. Numbers in parentheses indicate the number of specimens tested for that data point; the standard deviation for each was ≤ 5%.

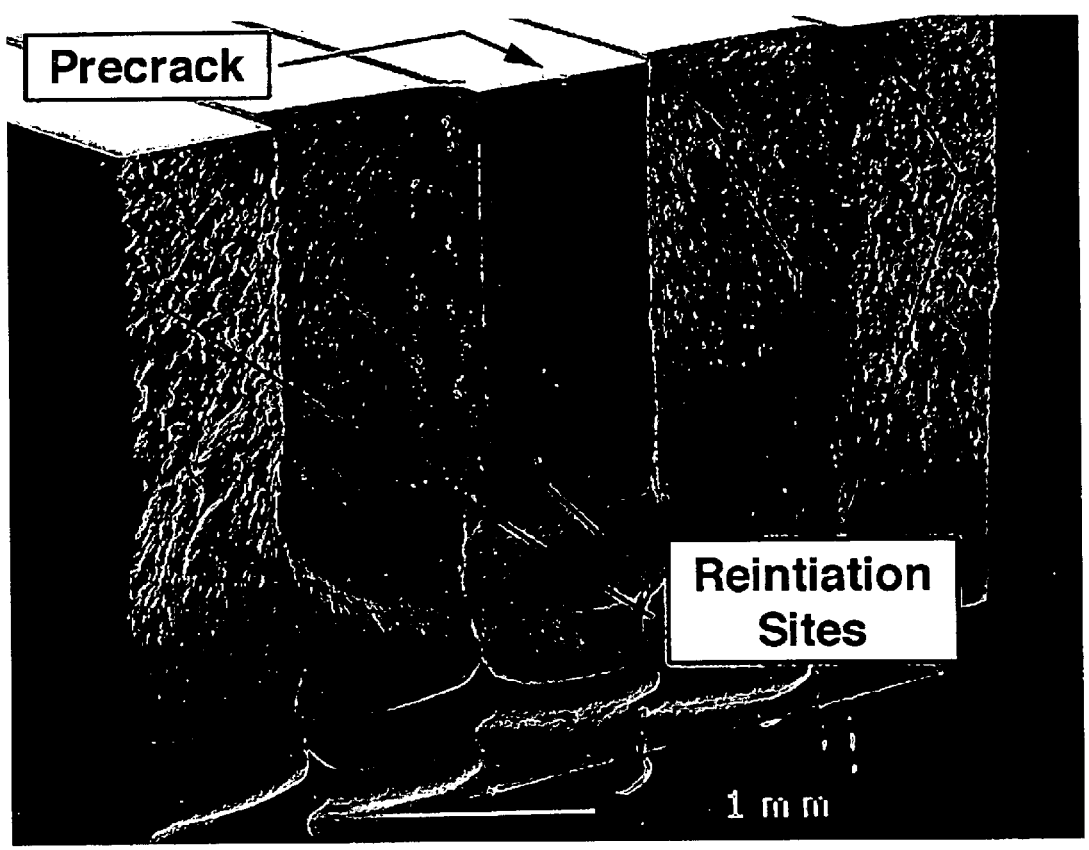
Fig. 4 A scanning electron micrograph of a typical fracture surface where fracture initiated, then arrested, in the central layer from the indentation crack. The top surface was the tensile face of the specimen.

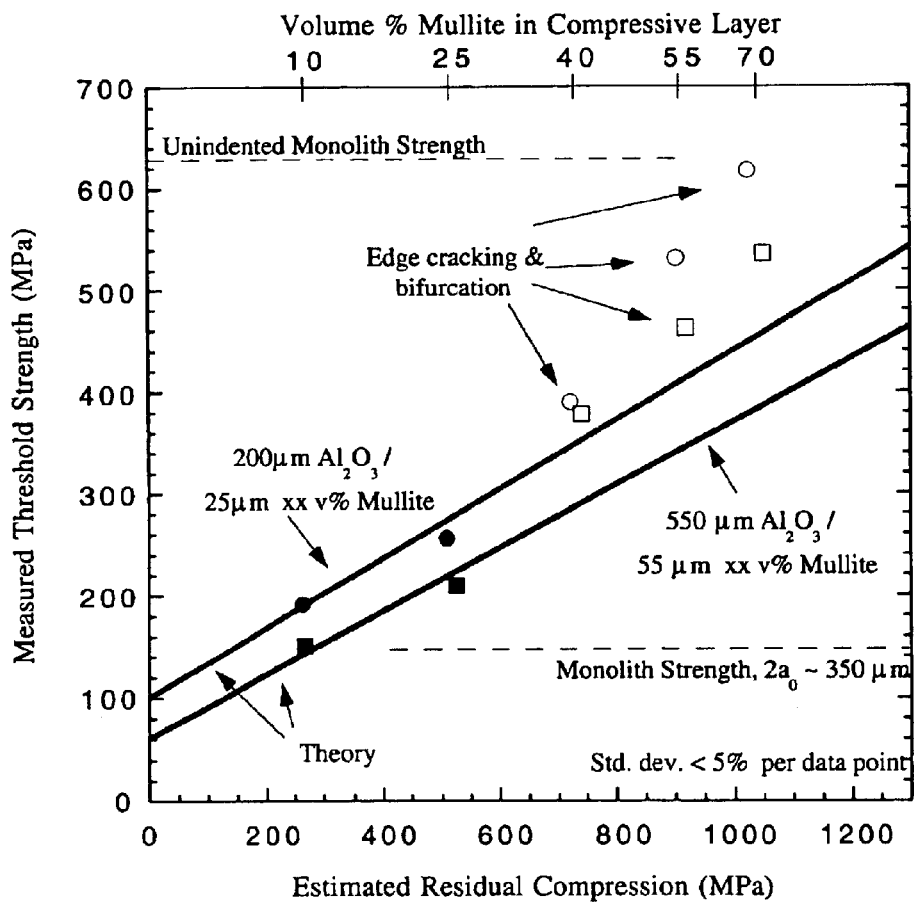

Fig. 5 Experimental data to determine the effect of residual, biaxial compressive stress on threshold strength. Solid lines represent theory for the two different composites architectures (both have similar layer thickness ratios for each composition, therefore similar residual stress levels, but different overall thicknesses). Composites that agree well with theory have cracks that extend straight through compressive layer as modeled by theory. Composites that have a higher threshold strength relative to theory have cracks that bifurcate within the compressive layers.

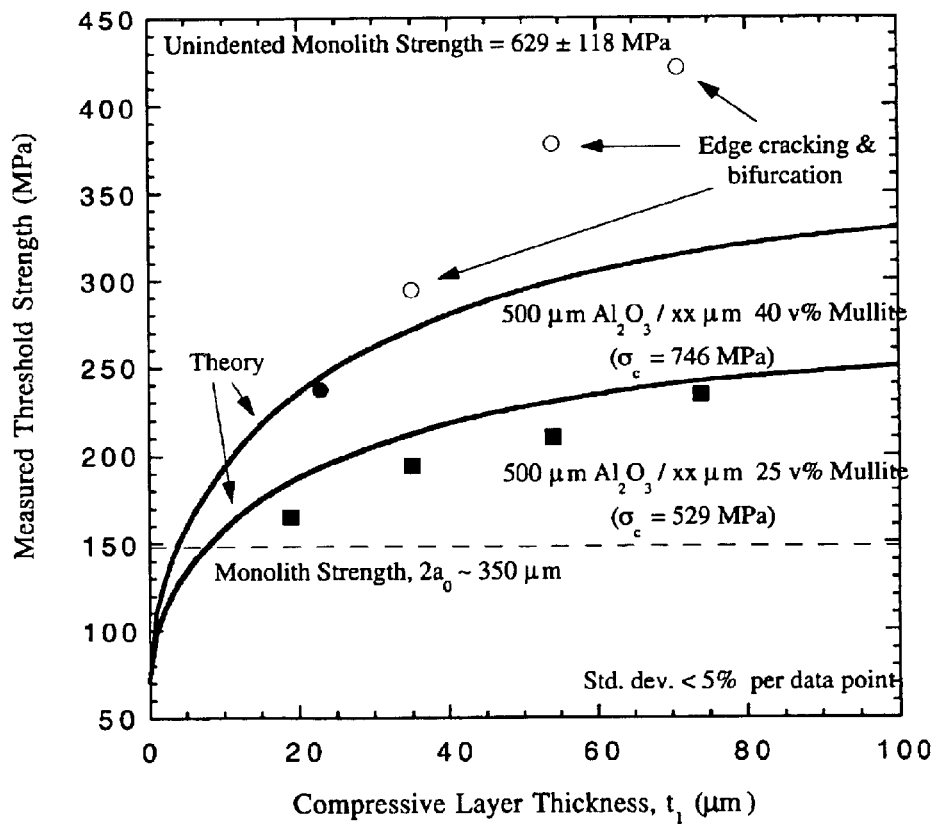

Fig. 6 Experimental data used to determine the effect of compressive layer thickness on threshold strength. Solid lines represent theory for the two different composites architectures (both have similar layer thickness ratios but different compositions for each compressive layer thickness, therefore different residual stress levels). Composites that agree well with theory have cracks that extend straight through compressive layer as model by theory. Composites that have a higher threshold strength relative to theory have cracks that bifurcate within the compressive layers.

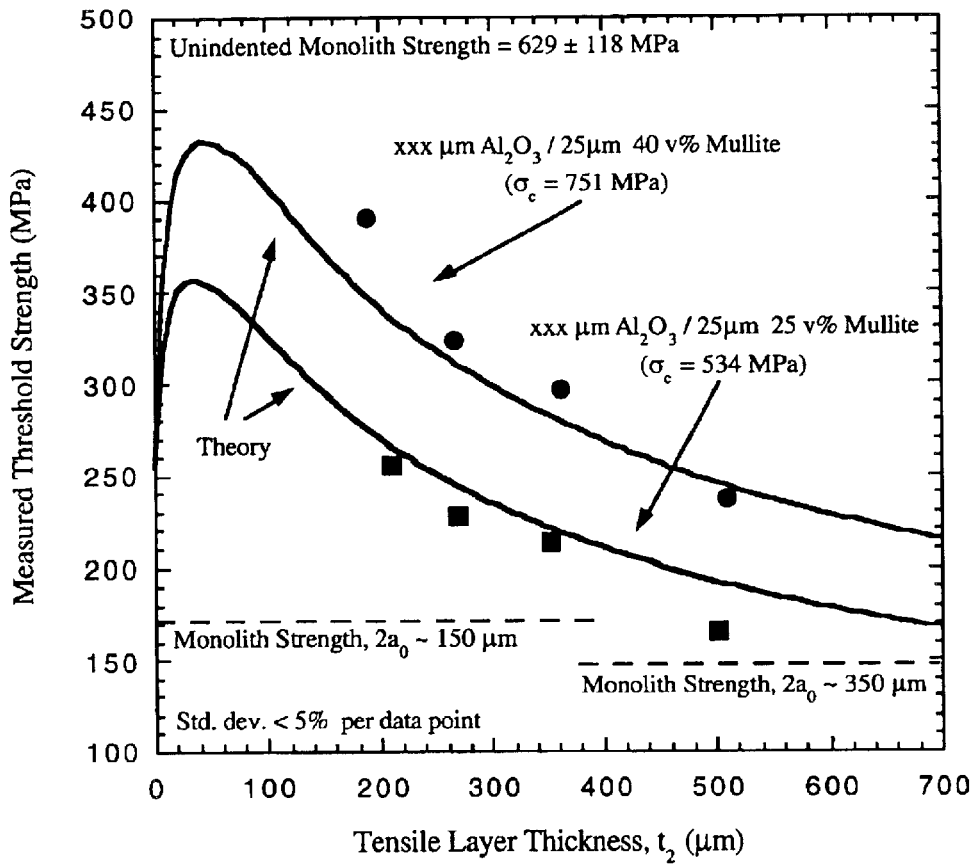

Fig. 7 Experimental data used to determine the effect of tensile layer thickness on threshold strength. Solid lines represent theory for the two different composites architectures (both have similar layer thickness ratios but different compositions for each tensile layer thickness, therefore different residual stress levels). Composites that agree well with theory have cracks that extend straight through compressive layer as model by theory.

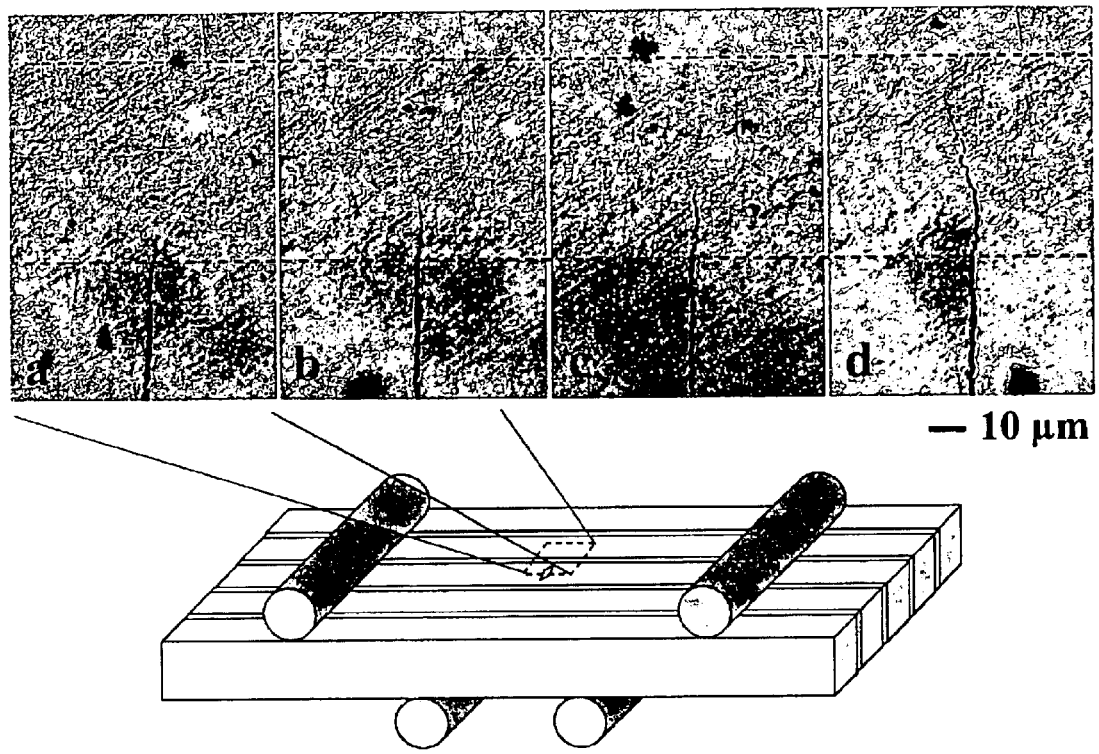

Fig. 8 Schematic of the transverse 4-point flexure configuration and optical micrographs of cellulose acetate replicas of the arrested crack within one of the compressive layers of one of the specimens with compressive layers formed with 0.25 volume fraction of mullite taken during loading at applied stresses of: a) 112 MPa; b) 140 MPa; c) 168 MPa; and d) 195 MPa. The specimen failed soon after at an applied stress of 208 MPa. Crack penetration depths within the compressive layers of 10, 17.5, 30, and 47.5 $\mu$m, respectively, were measured from the micrographs. Note: Dashed lines were added to indicate the boundaries of the compressive layer.

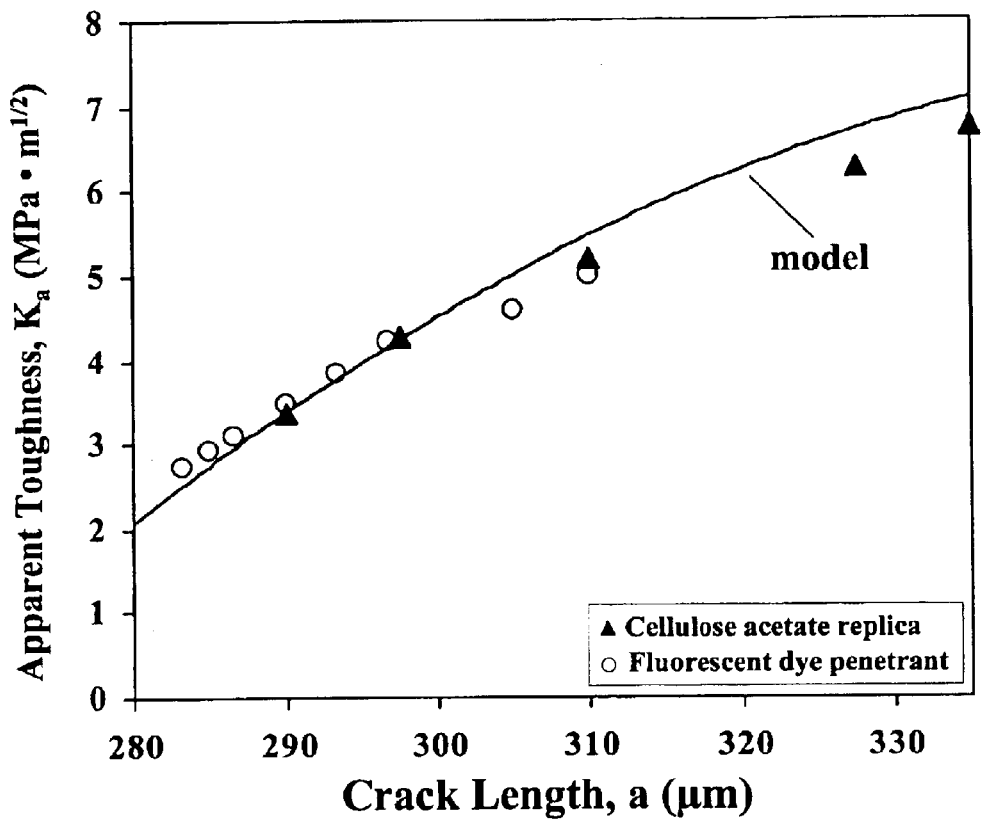
Fig. 9 Plot of predicted vs. observed *apparent toughnesses*, $K_a$, for cracks propagating through compressive layers formed of 0.25 volume fraction of mullite. Solid line represents model prediction. Crack growth was observed by either cellulose acetate replication or fluorescent dye penetrant.

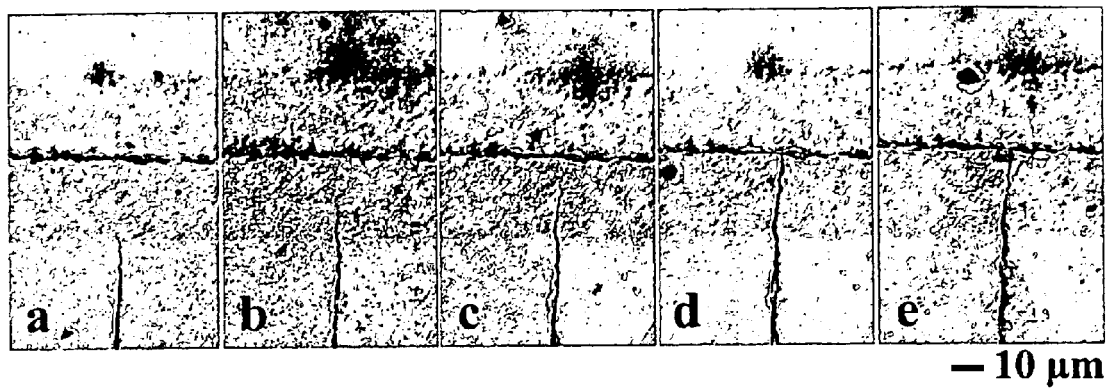

Fig. 10 Optical micrographs of cellulose acetate replicas of the arrested crack within one of the compressive layers of one of the specimens with compressive layers formed with 0.55 volume fraction of mullite taken during loading at applied stresses of: a) 100 MPa; b) 151 MPa; c) 201 MPa; d) 251 MPa; and e) 301 MPa. Crack lengths of 5, 10, and 20 μm, respectively, were measured before the crack reached the edge crack (25 μm into the compressive layer) after which no further propagation was observed until failure occurred at an applied stress of 389 MPa. Note: Cracking observed along the midplane of the compressive layer occurred before loading and is the edge crack that formed on the new free surface revealed by grinding and polishing.

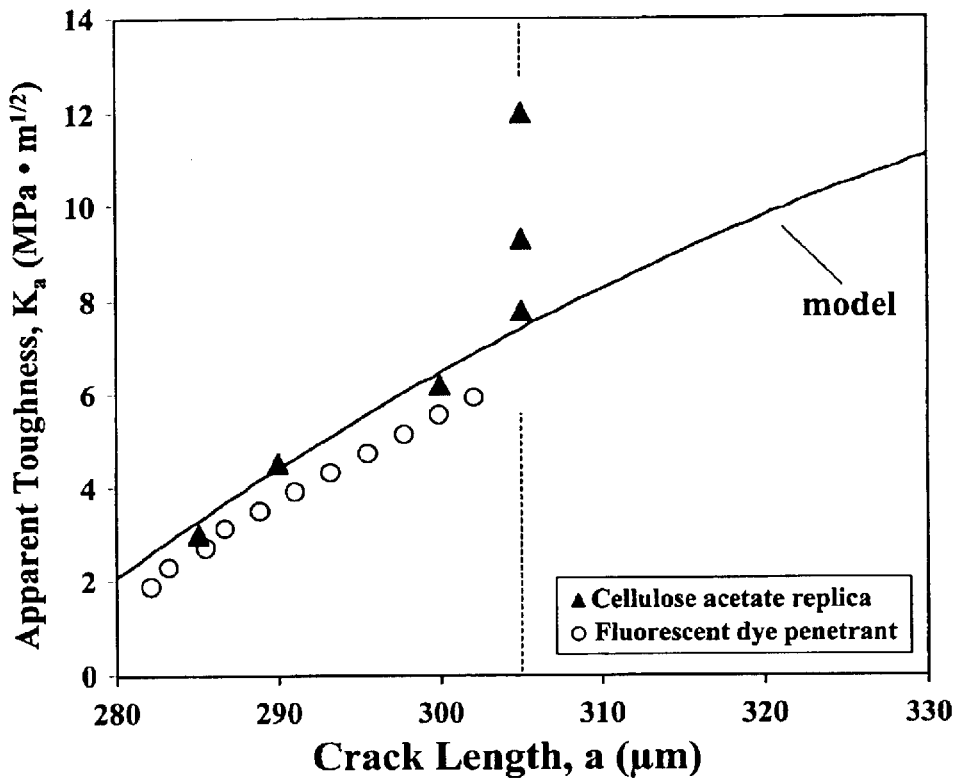

Fig. 11 Plot of predicted vs. observed *apparent toughnesses*, $K_a$, for cracks propagating through compressive layers formed of 0.55 volume fraction of mullite. Solid line represents model prediction. Crack growth was observed by either cellulose acetate replication or fluorescent dye penetrant. The broken vertical dashed line on plot indicates the position of the edge crack in the compressive layer.

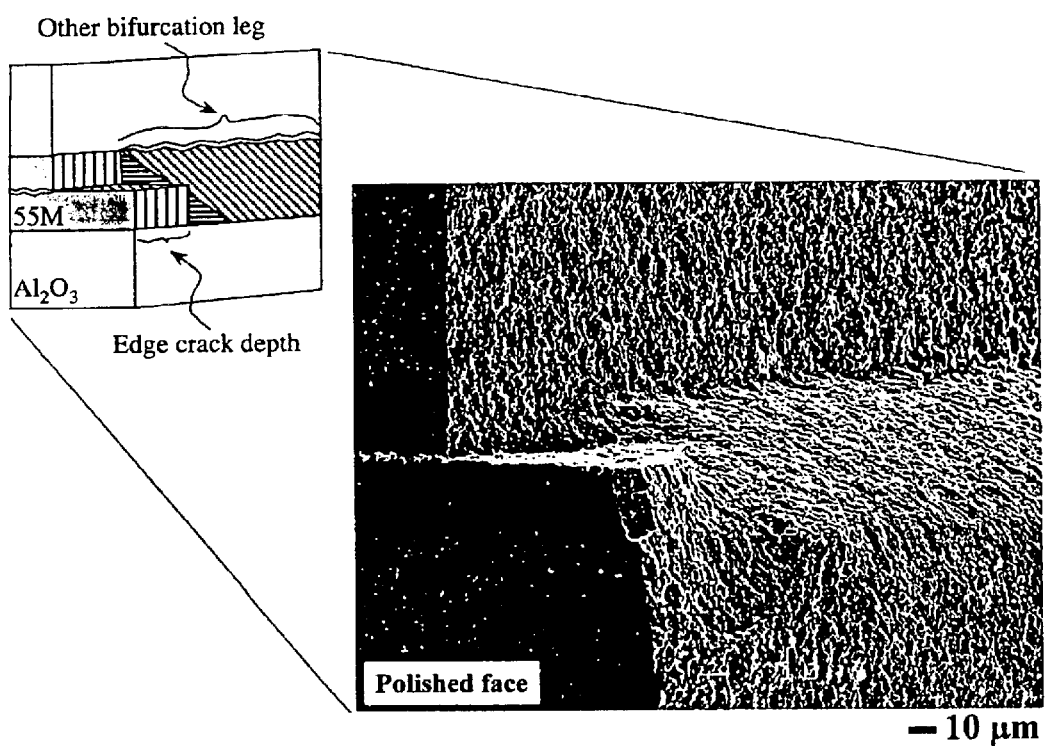

Fig. 12 Scanning electron micrograph and schematic of the fracture surface of one of the specimens with 0.55 volume fraction mullite compressive layers in the region near the tensile face of the bar (smooth area on left of picture) showing the transition between the cracking observed on the surface and the bifurcation that occurs within the bulk, beneath the penetration depth of the edge crack.

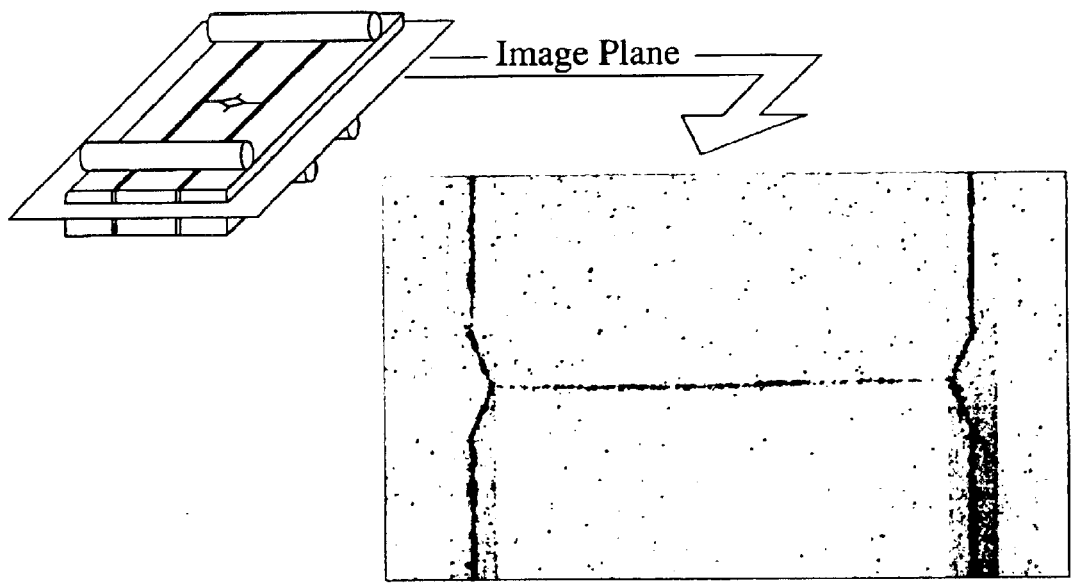

Fig. 13 Optical micrograph of the bifurcation of the crack beneath the tensile surface of a specimen with 0.55 volume fraction compressive layers revealed by grinding down to just below the penetration depth of the edge crack (~30 $\mu$m). Note: Observed edge crack reformed on the new free surface upon grinding, as is evidenced by its absence between the branches of the bifurcated crack where the tensile surface stresses are relieved.

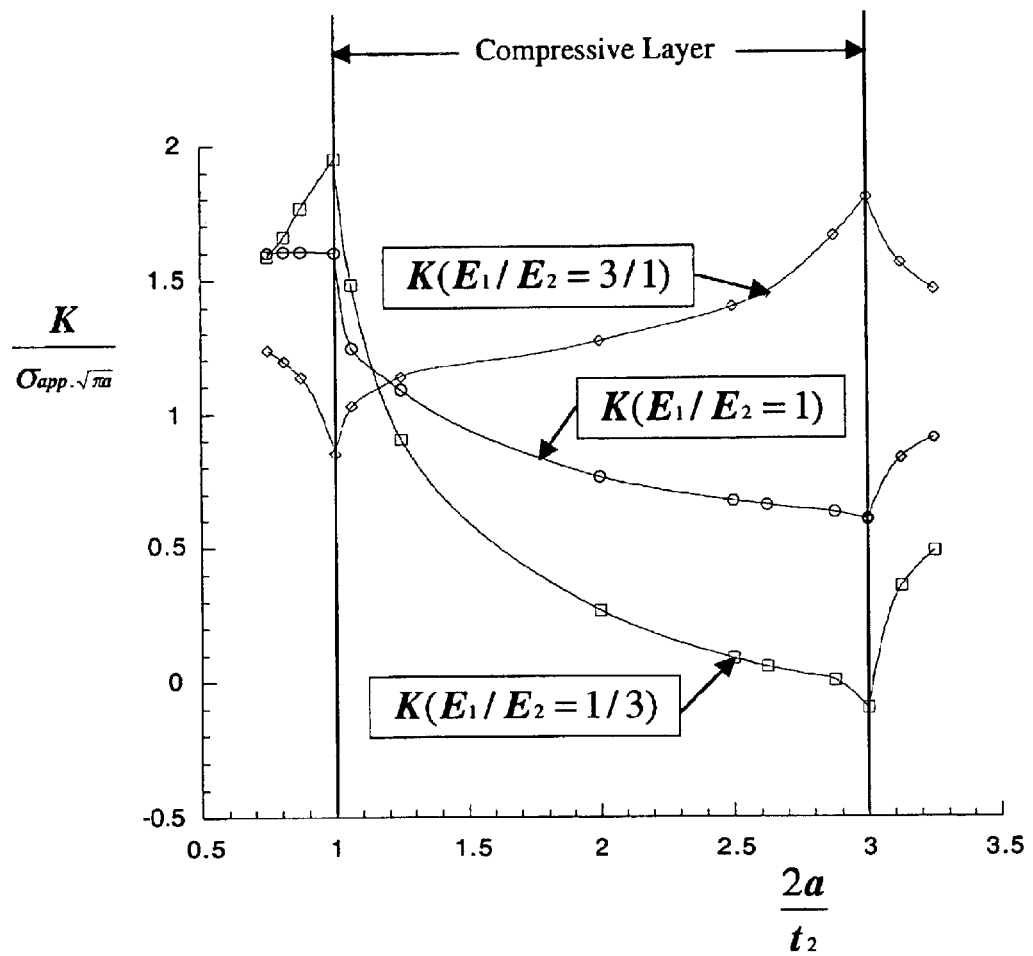
Fig. 14 Results of finite element analysis for crack extension through a compressive layer with three different elastic moduli ratios. For the three cases shown, largest resistance to crack propagation is obtained when $E_1/E_2 = 1/3$, that is, when the elastic modulus of compressive layer is lower than thicker, tensile layer.

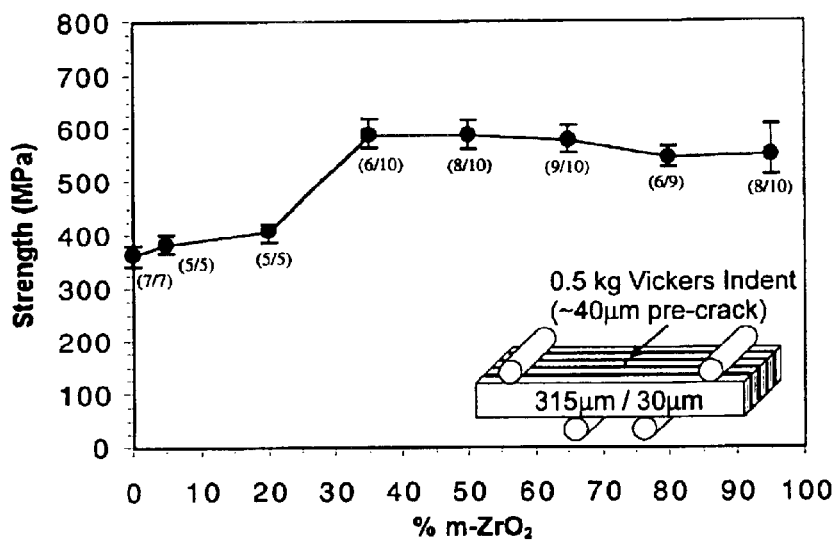
Fig. 15 Threshold strength vs. vol% monoclinic (unstabilized) zirconia in compressive layer formed with mixture of m-zirconia + alumina to change compressive stress arising during phase transformation.

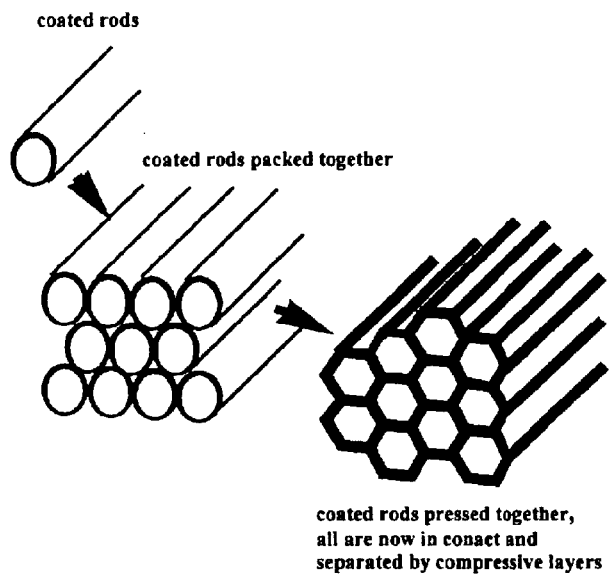

Fig. 16 Composite architecture developed to produce compressive layers within body formed of hexagonal prisms of one or more materials, separated by and bonded together with compressive layers formed of another material. Figure illustrates that this architecture is produced by coating rods formed of one or more materials with another material that will produced a compressive stress, stacking them in a hexagonal array, pressing them together, and then heat treating the array at high temperatures to bond the prisms together and produced densification.

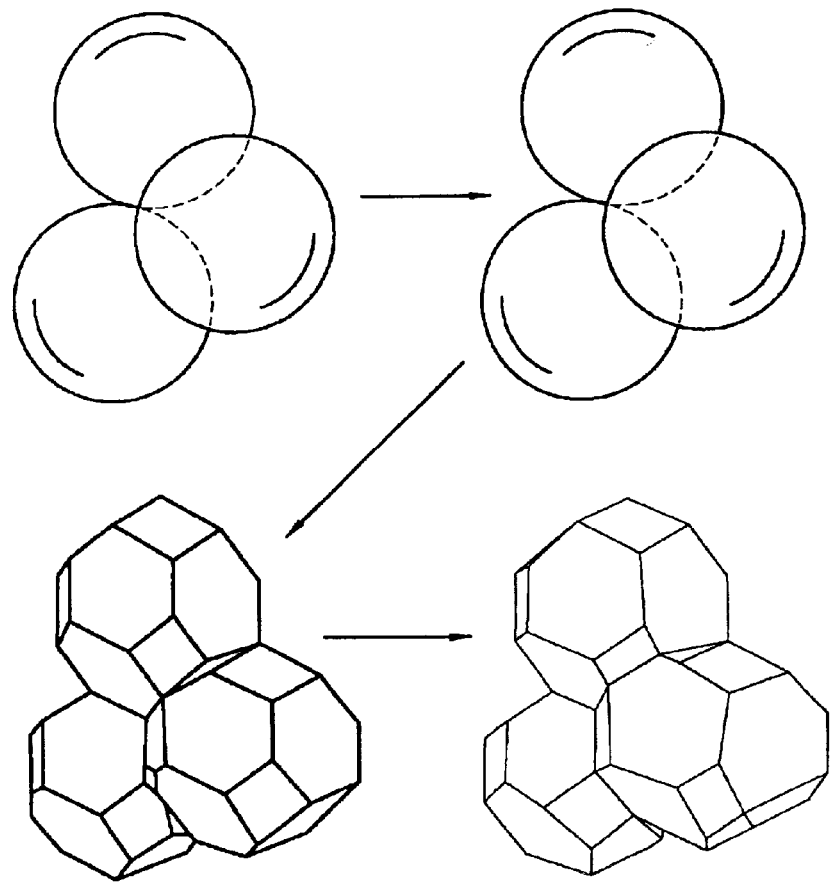

Fig. 17 Composite architecture developed to produce compressive layers within body formed of polyhedra of one or more materials, separated and bonded together with compressive layers formed of another material. Figure illustrates that this architecture is produced by coating spheres formed of one or more materials with another material that will produced a compressive stress, packing them together, pressing them together to convert the point contact into a complete area contact (follow arrows from top to bottom, and then heat treating the array at high temperatures to bond the polyhedra together and produce densification.)

METHOD FOR IMPROVING THE RELIABILITY OF BRITTLE MATERIALS THROUGH THE CREATION OF A THRESHOLD STRENGTH

STATEMENT REGARDING FEDERALLY SPONSORED RESEARCH OR DEVELOPMENT

This invention was made with Government support under Grant No. N00014-99-1-0638, awarded by the Office of Naval Research. The Government has certain rights in this invention.

BACKGROUND OF THE INVENTION

1. Field of Invention

This discovery concerns the improvement of the reliability and damage tolerance of brittle materials through the use of novel crack arresting architectures composed of compressive layers specifically placed throughout the body that prevent failure from occurring until a specific, predetermined threshold strength is reached.

2. Description of Related Art

The strength of most common brittle materials is not deterministic, i.e. single-valued, due to the presence of an unknown distribution of strength-limiting flaws inadvertently introduced during processing and surface machining [1,2]. As a result, the strength of brittle materials must generally be described by a statistical distribution of strengths with associated probabilities of failure at each of those strengths. Failure from these types of flaws is generally not an issue in ductile materials because they exhibit plastic deformation that desensitizes the relation between small flaws and strength. Plastic deformation also absorbs work from the loading system to increase the material's resistance to the extension of large cracks. However, the lack of plastic deformation in brittle materials causes their strength to be inversely dependent on the size of very small cracks, which generally cannot be detected except by failure itself.

Consequently, design with brittle materials generally becomes a practice of defining acceptable levels of reliability. Designers must not only make accommodations for probabilistic definitions of the strength and the finite probability of failure at any applied stress, but they must also be further concerned with the fact that, once in service, seemingly insignificant and sometimes undetectable damage could be incurred that would drastically reduce the load carrying ability of the material. This lack of reliability is one of the major reasons why brittle materials have not been more widely used, despite the potential they offer for substantial performance enhancements in a wide variety of applications.

One method for improving the reliability of components made from brittle materials has been through the use of proof testing. The proof test is designed to emulate the thermomechanical stresses experienced by the component in severe service and defines a threshold stress below which components are eliminated by failure prior to service. However, given its destructive nature, proof testing is generally only used when performance needs outweigh consumer price sensitivity. In ceramics, another approach to ensuring reliability is by eliminating heterogeneities that give rise to flaws, such as inclusions and agglomerates, from the ceramic powder. One method to remove heterogeneities greater than a given size is to disperse the powder in a liquid and pass the slurry through a filter [1]. If heterogeneities are not reintroduced in subsequent processing steps, and surface cracks introduced during machining are not a critical issue, filtration determines a threshold strength by defining the largest flaw that can be present in the powder and thus, within the finished ceramic component [3]. However, neither of these techniques mitigates the detrimental effect of service-related damage.

Recently, another method for improving reliability through the use of residual, compressive stresses that have their maxima located some specific distance beneath the surface of the material was proposed by Green et al [4]. The authors suggested that the unique compressive stress profiles they developed would arrest surface cracks and lead to higher failure stresses and improved reliability through reduced strength variability. However, compressive stresses, either at or just beneath the surface, will not effectively hinder internal cracks and flaws, nor can they produce a threshold strength; thus high reliability is still not ensured. As shown below, a threshold strength can only arise when compressive layers are placed on the surface and throughout the body to interact with both surface cracks and internal cracks and flaws.

SUMMARY OF THE INVENTION

The present invention provides a new method for fabricating reliable, damage-tolerant brittle materials. By incorporating layers of one material under residual compression on the surface and throughout the bulk of one or more other materials, a composite is formed in which the propagation of otherwise catastrophic cracking is arrested. The residual compression within these layers acts to reduce the stress intensity of the cracks, thereby causing them to arrest until further loading is provided. This highly desirable stable, subcritical crack growth mode persists with increased loading until the applied stress is large enough to drive the crack completely through compressive region, after which failure occurs.

The exact level of stress needed to cause failure is dictated by the architectural design of the compressive layers such that the material can be designed to have any minimum strength desired, within the limits of the materials system used. This results in a truncation of the strength distribution, such that there is virtually zero probability of failure below this minimum value, i.e. the material possesses a threshold strength. Consequently, sensitivity to flaws that would ordinarily cause catastrophic failure at stresses below the threshold strength is eliminated. Furthermore, the potential exists for the complete elimination of the strength variability, hence improving reliability, through the creation of nearly deterministic, i.e. single-valued, strengths by increasing the threshold strength above the stresses at which failure normally initiates from intrinsic flaws.

The potential this invention offers for the implementation of brittle materials in high-performance structural applications ranging from high-temperature gas turbine engines to biomedical prosthetic implants is significant. Elimination of the need for designers to rely on probabilistic strength definitions and acceptable failure probabilities will allow for design using conventional engineering methodologies, thereby facilitating the introduction of these materials.

These and other features, aspects, and advantages of the present invention will become better understood with regard to the following detailed description, claims, and accompanying drawings.

BRIEF DESCRIPTION OF THE DRAWINGS

FIG. 1 is a schematic representation of the superimposed stress fields used to determine the stress intensity of the arrested crack;

FIG. 2 shows the results of the optimization analysis as a plot of $t_2/t_1$ as a function of the independent variables;

FIG. 3 is a plot of the failure strength of the laminated and monolithic specimens with varying starting flaw sizes;

FIG. 4 is a scanning electron micrograph of the fracture surface of one of the laminate specimens;

FIG. 5 is a plot of the threshold strength vs. magnitude of residual compression within the compressive layers for two different laminate architectures;

FIG. 6 is a plot of the threshold strength vs. compressive layer thickness for two different laminate architectures;

FIG. 7 is a plot of the threshold strength vs. tensile layer thickness for two different laminate architectures;

FIG. 8 is an optical micrograph of replicas made of a crack propagating across the tensile surface of a non-edge cracked laminate;

FIG. 9 is a plot of the stress intensity vs. the crack length for a crack propagating through a non-edge cracked compressive layer;

FIG. 10 is an optical micrograph of replicas made of a crack propagating across the tensile surface of an edge cracked laminate;

FIG. 11 is a plot of the stress intensity vs. the crack length for a crack propagating through an edge cracked compressive layer;

FIG. 12 is a scanning electron micrograph of the fracture surface of a specimen that exhibited edge cracking;

FIG. 13 is an optical micrograph showing the bifurcation of the crack within the bulk of an edge cracked specimen, beneath the penetration depth of the edge crack;

FIG. 14 is a plot of the stress intensity of a crack propagating through the compressive layer as a function of distance showing the effect of modulus mismatch;

FIG. 15 is a plot of the threshold strength vs. amount of m-$ZrO_2$ for $Al_2O_3$ laminates with $Al_2O_3$ /m-$ZrO_2$ compressive layers;

FIG. 16 is a schematic diagram of the composite architecture needed to produce compressive layers within a body formed of hexagonal prisms of one or more materials, separated and bonded together with compressive layers formed of another material; and FIG. 17 is a schematic diagram of the composite architecture needed to produce compressive layers within a body formed of polyhedra of one or more materials, separated and bonded together with compressive layers formed of another material.

DETAILED DESCRIPTION

The hypothesis that multiple, thin compressive layers could lead to a threshold strength in brittle materials had its genesis in an inadvertent observation made by one of us (Antonio Javier Sanchez Herencia) in which a crack was observed to initiate and arrest between two compressive layers during experiments to further understand the phenomena of crack bifurcation, that is, the 90° change in the direction of a crack as it enters and extends along the center line of a compressive layer [5–7]. This observation initiated a fracture mechanics analysis to determine the conditions for crack arrest and subsequent failure, and subsequent experiments to test the analysis [8].

Mechanical Analysis of the Arrest Phenomena and Development of the Threshold Strength Model A residual, biaxial, compressive stress arises within layers of thickness $t_1$, known as compressive layers, either surface or internal, when they are compressed relative to a second set of alternating layers of thickness, $t_2$. This compression can arise due to a compressive strain mismatch, $\epsilon$, caused by either a mismatch in the thermal expansion coefficients of the laminae, or by a volume change of either of the laminae through a crystallographic phase transformation or formation of a chemical reaction product. For the specific case of a laminated plate composed of compressive layers ($t_1$), alternated between tensile layers ($t_2$), the biaxial stresses in both layers are given by [9]

$$\sigma_1 = \varepsilon E_1' \left(1 + \frac{t_1 E_1'}{t_2 E_2'}\right)^{-1} \quad \text{and} \quad \sigma_2 = -\sigma_1 \frac{t_1}{t_2} \tag{1}$$

where $E_i' = E_i/(1-v_i)$, E is Young's modulus and v is Poisson's ratio. Inspection of the two relations shows that thin compressive layers are desired because when $t_1/t_2 \to 0$ the compressive stress is maximized while the tensile stress diminishes to zero in the thicker layers.

The analysis of the observed arrest phenomena assumes that a pre-existing crack of length 2a spans the thick layer ($t_2$), sandwiched by the compressive, thin layers of thickness $t_1$, as shown on the left side of FIG. 1. The magnitude of the biaxial, residual compressive stress within the thin layers is given by $\sigma_c$, and the opposing residual tensile stress within the thick layer is given by $\sigma_r$. The analysis determines the stress intensity factor for a crack of length 2a when it extends into the compressive layers ($t_2 \leq 2a \leq t_2 + 2t_1$), under an applied stress, $\sigma_a$, parallel to the layers. The stress intensity factor is used to determine the applied stress, $\sigma_{thr}$, needed to extend the crack through the compressive layers to produce catastrophic failure.

The stress intensity factor, K, is determined by superimposing the two stress fields shown on the right hand side of FIG. 1, each applied to the same slit crack of length 2a, and each with its own, known stress intensity factor. The first is a tensile stress of magnitude $\sigma_a - \sigma_c$ applied to a cracked specimen that does not contain residual stresses. The stress intensity factor for this stress is given by the first term on the right hand side of Eq. 2A. The second is a tensile stress of magnitude $\sigma_c + \sigma_r$, which is only applied across the thick layer, the portion of crack defined by $t_2$. Its stress intensity factor is given by the second term on the right side of Eq. 2A [10]. The two superimposed stress fields sum to that shown on the left hand side of FIG. 1. The stress intensity factor for the two superimposed stress fields is thus given by $$K = (\sigma_a - \sigma_c)\sqrt{\pi a} + (\sigma_c + \sigma_t)\sqrt{\pi a}\left[\frac{2}{\pi}\sin^{-1}\left(\frac{t_2}{2a}\right)\right] \tag{2A}$$

Substituting $\sigma_t = \sigma_c t_1/t_2$ (from Eq. 1) and rearranging, Eq. 2A better expresses the physical significance of the compressive layers:

$$K = \sigma_a\sqrt{\pi a} + \sigma_c\sqrt{\pi a}\left[\left(1 + \frac{t_1}{t_2}\right)\frac{2}{\pi}\sin^{-1}\left(\frac{t_2}{2a}\right) - 1\right] \tag{2B}$$

The first term in Eq. 2B is the well know stress intensity factor for a slit crack in an applied tensile field. The second term is always negative and thus reduces the stress intensity factor when the crack extends into the compressive layers. Thus, the compressive layers increase the material's resistance to crack extension.

Because K decreases as the crack extends into the compressive layers, the maximum stress needed to cause the crack to 'break' through the compressive layers occurs when $2a=t_2+2t_1$ and $K=K_c$, the critical stress intensity factor of the thin layer material, a property that describes its intrinsic resistance to crack extension. Substituting these values into Eq. 2B and rearranging, the largest stress needed to extend the crack through the compressive layers is given by $$\sigma_{thr} = \frac{K_c}{\sqrt{\pi\frac{t_2}{2}\left(1+\frac{2t_1}{t_2}\right)}} + \sigma_c\left[1-\left(1+\frac{t_1}{t_2}\right)\frac{2}{\pi}\sin^{-1}\left(\frac{1}{1+\frac{2t_1}{t_2}}\right)\right] \quad (3)$$

Equation 3 shows that $\sigma_{thr}$ increases with the fracture toughness of the thin layer material, $K_c$, the magnitude of the compressive stress, $\sigma_c$, and the thickness of the compressive layer, $t_1$. One can also show that if the initial crack length in the thick layer is $<t_2$, and the stress needed to extend it is $<\sigma_{thr}$, the crack will be arrested by the compressive layers. However, if the crack is very small and extends at a stress$>\sigma_{thr}$, it will extend though the compressive layers to cause catastrophic failure without being arrested. Thus, Eq. 3 defines a threshold stress, $\sigma_{thr}$, below which the laminar body cannot fail when the tensile stress is applied parallel to the layers. This prediction has significant implications in that it offers the opportunity to design structural components with the knowledge that the component will not fail below the specified threshold stress.

It has been shown [11] that the conditions that optimize the threshold strength could be determined by differentiating Eq. 3 with respect to the dependent variable, $t_2/t_1$. FIG. 2 shows the results of this optimization analysis, which plots $t_2/t_1$ as a function of the independent variables. Optimum threshold strengths are obtained by choosing values for the independent variables that can be practically achieved through material choice and processing constraints, and then determining the dependent variable, $t_2/t_1$ using FIG. 2. Inspection of Eq. 3 shows that minimization of the layer thicknesses is desirable, as it will lead to higher threshold strengths. However, current processing technology limits the minimum thickness achievable to ~5 μm; this thus serves as the constraint for the optimization. For the given $Al_2O_3$/mullite system with 5 μm thick compressive layers, FIG. 2 shows that threshold strength will be optimized at a $t_2/t_1$ ratio of ~1.6, thus $t_2$=7.95 μm and $\sigma_c$=1085 MPa. Substituting these values into Eq. 3, one finds that a threshold strength of 945 GPa is possible in this particular system, which is nearly as large as the compressive stress, despite that fact that the ratio $t_2/t_1$=1.6 produces large tensile stresses in the thicker layers separating the compressive layers.

While this is an impressive result, even higher threshold strengths far in excess of the residual compression may be possible in systems with higher toughness compressive layers. Application of FIG. 2 to a laminate system composed of silicon carbide (SiC) tensile layers and silicon nitride ($Si_3N_4$, $K_c$=8 Mpa·m$^{1/2}$) compressive layers, with the compressive layers again constrained to 5 μm, yields an estimated threshold strength in excess of 2 GPa, despite the fact that ac in this system is only 676 MPa. Strengths of this magnitude are rarely if ever seen in polycrystalline ceramics and are closer to those expected for single crystal fibers. Single crystal fibers, however, do not share the flaw tolerance capability that these laminates would.

Experimental Validation of the Model

To test the threshold strength concept and its predicted improvement of flaw tolerance, starting flaws of varying size were introduced into laminar ceramic composite specimens made up of tensile layers composed of aluminum oxide ($Al_2O_3$) and compressive layers composed of a mixture of mullite (3 $Al_2O_3$:2 $SiO_2$) and $Al_2O_3$. Residual compressive stresses of ~1.2 GPa were developed in the mullite/alumina layers during cooling from processing temperatures due to the mismatch of the thermal expansion coefficients of the tensile and compressive layers. These specimens were then tested to failure and the strengths were compared to those of unreinforced monolithic specimens with similar sized starting flaws.

FIG. 3 shows that, as predicted, the failure stress of the laminates was relatively independent of the initial flaw size, while the strength of the monolithic alumina without the compressive layers was strongly flaw dependent. In addition, the morphology of the fracture surfaces of these specimens (FIG. 4) indicated that not only did the compressive layers arrest the initial propagation of otherwise catastrophic cracking initiating from the starting flaws, but they also allowed the specimens to endure a substantial amount of further loading before failure occurred, despite the presence of cracks that constituted a significant portion of the load-bearing cross-section of the specimen.

Further testing of laminate specimens with varying architectures [12] has validated our theory through independent investigation of the effects of the three most important independent variables in Eq. 3, namely the magnitude of the residual compression, the effect of the compressive layer thickness, and the effect of the tensile layer thickness. FIGS. 5, 6, and 7 show the effect of these parameters and their close correlation to the strengths predicted through the application of Eq. 3. However, the data also show that the current theory ceases to accurately describe the experimental data when the magnitude of the residual compression is large and/or when the thickness of the compressive layers is large.

Closer inspection of the propagation of the cracking within the compressive layers [13] has revealed that the reason for this discrepancy lies in the presence of two distinctly different crack propagation modes. As seen in FIG. 8, cracking in laminates with thin compressive layers under moderate levels of residual compression is observed to propagate in a stable manner, straight across the compressive layers, exactly as was assumed in the derivation of the current theory. In these cases, close correlation is seen between the predicted and measured threshold strengths, as well as the predicted and measured propagation lengths, as seen in FIG. 9.

However, observations also show that once the residual compression and/or the compressive layer thickness exceed a critical value, edge cracking [14] appears on the surface, as seen in FIG. 10, which prevents the further propagation of the crack until failure occurs at much higher loads. Measured failure strengths in these cases generally far exceed those predicted by Eq. 3, while the arrest of the cracking at the edge crack conflicts with predictions of further extension, as seen in FIG. 11. Inspection of the fracture surfaces of these specimens (FIG. 12) and observation of the propagation of the crack beneath the penetration depth of the edge crack (FIG. 13) shows that bifurcation of the crack occurs, which begins to explain the discrepancies in measured and predicted threshold strengths. It is intuitively obvious that it will take much more stress to drive two cracks simultaneously at angles severely inclined to the applied tensile stress axis. Crack propagation of this type is not accounted for in the current model, which therefore invalidates its application in these cases.

Further Finite Element Analysis

We are currently exploring the cause of bifurcation with the use of finite element analysis [15]. Early analysis has already shown that the single crack has a higher stress intensity factor relative to two bifurcating cracks. This would be expected since more energy is needed to drive two cracks than one. Thus, the reason does not lie within the magnitude of the strain energy released. Our current using the finite element approach to determine the T stress in front of the crack, as a function of the crack position within the compressive layer, has shown more success. The T stress is not dependent on either the radius vector or the angular position from the crack tip. When the T stress is compressive, the crack is expected to propagate on its symmetry plane; when it is tensile, the crack is expected to deviate onto another plane. Our finite element analysis does show that the T stress becomes a tensile stress when the compressive stress exceeds a given value and therefore begins to explain the cause of bifurcation. Further exploration of this approach is in progress.

Further finite element simulations have also shown that the arrest phenomena are strongly affected by the moduli of the laminae [16]. As can be seen in FIG. 14, the value of the stress intensity factor is decreased as it enters a compressive layer with a lower modulus relative to the thicker, tensile layer. That is, a compressive layer with a lower elastic modulus will further increase the threshold strength because it stores less elastic strain energy relative to a compressive layer made with a material with a higher elastic modulus. FIG. 14 also shows that if the elastic modulus of the compressive layer is too large, it may not stop crack extension at all. Thus, the most desired material couples that exhibit a threshold strength should have a compressive layer modulus less than the tensile layer modulus.

Developing Compressive Stresses via a Structural Phase Transformation

Although most of the experiments to test the initial model were performed with alumina and mullite/alumina layered materials that used the differential thermal contraction during cooling to develop the compressive stresses, we have also initiated a study [17] that uses a structural phase transformation to induce the biaxial compressive stresses. In the current case, we use the tetragonal to monoclinic phase transformation of unstabilized $ZrO_5$ to induce the compressive stresses. In this case, the thick (tensile) layers were composed of $Al_2O_3$, and the thinner compressive layers were formed of a mixture of unstabilized $ZrO_2$ and $Al_2O_3$. It was expected that the magnitude of compressive stresses would be controlled by the fraction of unstabilized $ZrO_2$ in the mixed layer, due to its molar volume increase during the structural phase transformation that occurs during cooling.

FIG. 15 reports the threshold strength as a function of the fraction of unstabilized $ZrO_2$ in the mixed layer. As shown, the threshold strength is high, but does not change with the volume fraction of $ZrO_2$ for fractions greater than 0.30 volume fraction of the unstabilized $ZrO_2$. This system is currently under study to understand the relation between the transformation and compressive stresses that arise during the biaxially constrained phase transformation.

Extension of the Threshold Concept to More Isotropic 3-Dimensional Architectures While the majority of the work undertaken thus far has focused on 2-dimensional laminated materials, it is immediately apparent that these anisotropic architectures will be unable to yield a threshold strength in conditions other than the highly simplified ones described thus far (i.e. loading direction parallel to the laminar plane, driving cracks oriented normal to the layers). In order for the threshold concept to be more versatile and robust, higher dimensionality composite architectures must be developed that allow for more isotropic arrest behavior.

As shown in FIGS. 16 and 17, we have discovered two different architectures where the compressive layer will stop cracks that extend in any direction. In the first [18], rods of one material are coated with a second material that will produced the compressive stresses. After bundling the coated rods, they are compressed and densified at high temperature to form a solid body that approximates an array of hexagonal prisms, with separated compressive layers on all sides as shown in cross section. Cracks that extend either along the axis or across the diameter of the hexagonal prisms will be stopped by the compressive layers that mutually bond the hexagonal prisms into a solid body.

In the second method [19], spheres of a material are coated with a second material that will form the compressive layer. As shown in FIG. 17, the spheres are mutually deformed by an applied isostatic pressure that converts the spheres into polyhedra that are separated by layers of a material that will form compressive layers. This array of polyhedra is then densified with a high temperature heat treatment to form a dense, solid body composed of polyhedra of one material surrounded and bonded together by compressive layers of a second material. It is obvious that cracks that extend in any direction within the material forming the polyhedra will be stopped by the compressive layers.

General Comments

All other factors being equal, the smaller the separation distance between compressive regions, the higher the threshold strength. The threshold strength is optimized when the distance separating the regions of the material(s) that do(es) not contain compressive stresses is between 0.2 and 0.01 times the dimension of the material(s) that do(es) not contain the compressive stresses, as measured from the interface between the materials. All else being equal, the larger the compressive stress, the larger the threshold stress. Compressive stresses in the range of 500 MPa to 5000 MPa are desired.

A composite can be formed in which the compressive stresses arise during cooling from a processing temperature to room temperature, caused by the differential strain induced by the differential thermal contraction coefficients of the different materials used to form the composite; and in which the materials are chosen from a list that includes at least two materials that do not react together to form a third material, but have differential thermal contraction coefficients such that compressive stresses would arise in one of the materials during cooling from a processing temperature, this list including, but not limited to, alumina ($Al_2O_3$), zirconia ($ZrO_2$), mullite (3 $Al_2O_3$:2 $SiO_2$), silicon nitride ($Si_3N_4$), silicon carbide (SiC), and titania ($TiO_2$). Examples of two materials chosen from this list would be alumina and zirconia, where the compressive stresses would arise in the alumina due to its lower thermal contraction coefficient; another example would be silicon nitride and silicon carbide, where the compressive stresses would arise in the silicon nitride due to its lower thermal contraction coefficient. A third example would be alumina and mullite, where the compressive stresses would arise in the mullite during cooling due to its lower thermal contraction coefficient.

Although the foregoing invention has been described in some detail by way of illustration and example for purposes of clarity and understanding, various modifications and changes which are within the knowledge of those skilled in the art are considered to fall within the scope of the claims.

REFERENCES

1. F. F. Lange, "Powder Processing Science and Technology for Increased Reliability," *J. Am. Ceram. Soc.* 72 [1], 3 (1989).

2. D. J. Green, *Introduction to Mechanical Properties of Ceramics* (Cambridge Univ. Press, Cambridge, UK, 1998).
3. V. K. Pujari et al., "Reliable Ceramics for Advanced Heat Engines," *Am. Ceram. Soc. Bull.* 74 [4], 86 (1995).
4. D. J. Green and R. Tandon, V. M. Sglavo, "Crack Arrest and Multiple Cracking in Glass Through the Use of Designed Residual Stress Profiles," *Science* 283, 1295 (1999).
5. M. Oechsner, C. Hillman, and F. F. Lange, "Crack Bifurcation in Laminar Ceramic Composites," *J. Am. Ceram. Soc.* 79 [7], 1834 (1996).
6. A. J. Sánchez-Herencia, C. Pascual, J. He, and F. F. Lange, "$ZrO_2/ZrO_2$ Layered Composites for Crack Bifurcation," *J. Am. Ceram. Soc.*, 82 [6], 1512 (1999).
7. A. J. Sánchez-Herencia, L. James, and F. F. Lange, "Bifurcation in Alumina Plates Produced by a Phase Transformation in Central, Alumina/Zirconia Thin Layers," *J. Eur. Ceram. Soc.*, 20 [9] 1295 (2000).
8. M. P. Rao, A. J. Sánchez-Herencia, G. E. Beltz, R. M. McMeeking, and F. F. Lange, "Laminar Ceramics That Exhibit a Threshold Strength," *Science* 286, 102 (1999).
9. C. Hillman, Z. Suo, and F. F. Lange, "Cracking of Laminates Subjected to Biaxial Tensile Stresses," *J. Am. Ceram. Soc.* 79 [8], 2127 (1996).
10. H. Tada, P. C. Paris, and G. R. Irwin, *The Stress Analysis of Cracks Handbook*, (Del Research Corp., St. Louis, Mo., ed. 2, 1985), p. 5.13.
11. R. M. McMeeking and Hbaieb K., "Optimal Threshold Strength of Laminar Ceramics," *Zeitshrift fuer Metalkunde*, 90 [12], 1031 (1999).
12. M. P. Rao and F. F. Lange, "Experimental Parametric Study of the Factors Affecting Threshold Strength in Laminar Ceramic Composites with Thin Compressive Layers," in preparation.
13. M. P. Rao, J. Rödel, and F. F. Lange, "Crack Propagation Modes in Laminar Ceramics That Exhibit a Threshold Strength," in preparation.
14. S. Ho, C. Hillman, F. F. Lange, and Z. Suo, "Surface Cracking in Layers Under Biaxial, Residual Compressive Stresses," *J. Am. Ceram. Soc.*, 78 [9] 1834–38 (1995).
15. Hbaieb K. and R. M. McMeeking, work in progress.
16. Hbaieb K. and R. M. McMeeking, "Optimization of the Threshold Strength of Laminar Ceramics Involving Elastic Modulus Mismatch Between Layers with the Finite Element Method," in preparation.
17. M. G. Pontin, M. P. Rao, A. J. Sánchez-Herencia, C. Pascual, and F. F. Lange, work in progress.
18. M. R. Snyder, M. P. Rao, A. J. Mercer, G. E. Hilmas, and F. F. Lange, work in progress.
19. G. E. Fair, M. P. Rao, and F. F. Lange, work in progress.

What is claimed is:

1. A composite comprised of at least two materials that exhibits a threshold strength in which
   the materials are strongly bonded together;
   residual, compressive stresses exist in only one of the materials;
   the material containing the compressive stresses stops cracks extending from the material that does not contain the compressive stress at an applied tensile stress less than the threshold strength;
   each material has a different chemical composition relative to the other;
   the material that contains the compressive stresses possesses the smallest volume fraction in the composite;
   the material containing compressive stresses separates and exists between the material that does not contain compressive stresses;
   the dimension of material that does not contain compressive stresses, measured perpendicular to the interface between the material that does contain the compressive stress and the material that does not contain the compressive stress, is smaller than 1000 microns;
   the dimension of material that does contain compressive stresses, measured perpendicular to the interface between the material that does contain the compressive stresses and the material that does not contain the compressive stresses is between 1 times and 0.001 times the dimension of the material that does not contain the compressive stresses; and
   the compressive stress is greater than 100 MPa.

2. A composite as in claim 1, in which layers of one material are separated by alternating layers of the other material; and in which all layers are bonded together; and in which one of the alternating materials contains biaxial, residual, compressive stresses; and in which, at applied tensile stresses less than a threshold value, cracks that extend from a layer that does not contain compressive stresses into the compressive layers are stopped and cannot cause catastrophic failure.

3. A composite as in claim 1 or 2 in which the compressive stresses arise during cooling from a processing temperature to room temperature, caused by the differential strain induced by the differential thermal contraction coefficients of the different materials used to form the composite.

4. A composite as in claim 1 or 2 in which the compressive stresses arise during cooling from a processing temperature to room temperature, caused by a volume expansion of the material with the smallest volume fraction, in which the volume expansion is produced by a crystallographic phase transformation during cooling.

5. A composite as in claim 1 or 2 in which the compressive stresses arise by a chemical reaction that produces a volume increase during high temperature processing and this increase in volume is constrained by a material that does not take part in the reaction, and in which materials formed during processing with the increased molar volume will contain compressive stresses, whereas the material that does not take part in the chemical reaction, but constrains the molar increase, will not contain compressive stresses.

6. A composite as in claim 1 or 2 in which the compressive stresses arise by a chemical reaction that occurs during high temperature processing and this increase in molar volume is constrained by a material that does not take part in the reaction; and in which the materials that react together are silica ($SiO_2$) and alumina ($Al_2O_3$), which form mullite (3 $Al_2O_3$:2 $SiO_2$), the material placed in compression when constrained by the material that does not take part in the reaction.

7. A composite as in claim 1 or 2 in which the compressive stresses arise during cooling from a processing temperature to room temperature, caused by the differential strain induced by the differential thermal contraction coefficients of the different materials used to form the composite; and in which the material containing compressive stresses and the material that does not contain compressive stresses are each chosen from a list of materials that includes at least two materials that do not react together at the processing temperature needed to form a strong bond, but have differential thermal contraction coefficients such that compressive stresses would arise in one of the materials during cooling from a processing temperature.

8. A composite as in claim 1 or 2 in which the compressive stresses arise during cooling from a processing temperature to room temperature, caused by the differential strain induced by the differential thermal contraction coefficients of the different materials used to form the composite; and in which the material containing compressive stresses and the material that does not contain compressive stresses are each chosen from a list of materials that includes at least two materials that do not react together, but have differential thermal contraction coefficients such that compressive stresses would arise in one of the materials during cooling from a processing temperature; and in which the material that does not contain the compressive stresses does contain another material that would impart an additional property that affects threshold strength.

9. A composite as in claim 1 or 2 in which the compressive stresses arise during cooling from a processing temperature to room temperature, caused by the differential strain induced by the differential thermal contraction coefficients of the different materials used to form the composite; and in which the material containing compressive stresses and the material that does not contain compressive stresses have differential thermal contraction coefficients such that compressive stresses will arise in one of the materials during cooling from a processing temperature; and in which the material that contains the compressive stresses also can contain another material that does impart an additional property important to mechanical strength and thus enhance the threshold strength and increase the crack growth resistance of the material containing the compressive stress.

10. A composite as in claim 1 or 2 in which the compressive stresses arise during cooling from a processing temperature to room temperature, caused by the differential strain induced by the differential thermal contraction coefficients of the materials used to form the composite; and in which at least one material is an amorphous material, without long range atomic order.

11. A composite as in claim 1 or 2 in which the compressive stresses arise during cooling from a processing temperature to room temperature, caused by the differential strain induced by the differential thermal contraction coefficients of the different materials used to form the composite; and in which at least one material is a polymer having a lower thermal contraction coefficient relative to the material that does not contain compressive stresses, and where the material not containing compressive stresses is another polymer, and where either the polymer material containing the compressive stress or the polymer material not containing the compressive stress also contain another material that imparts an additional property important to mechanical strength and thus enhance the threshold strength and increase the crack growth resistance of the material containing the compressive stress.

12. A composite as in claim 1 or 2 in which the compressive stresses arise during cooling from a processing temperature to room temperature, caused by a volume expansion produced by a crystallographic phase transformation during cooling; and in which the material that exhibits a volume increase due to a structural phase transformation is zirconia with the tetragonal structure at high temperature, which transforms at a temperature below approximately 1100° C. to its monoclinic structure with a volume increase of approximately 3%; and in which the other material is alumina or mullite which constrains the volume increase of the zirconia material and thus produce the desired compressive stresses in the transformed zirconia material.

13. A composite as in claim 6 in which the material that constrains the molar volume increase is alumina, and in which the volume fraction of the alumina is greater than the amount needed to form mullite when reacted with silica.

14. A composite as in claim 7 in which the material containing compressive stresses and the material that does not contain compressive stresses are each chosen from alumina, mullite, silicon nitride, silicon carbide, and titania.

15. A composite as in claim 8 in which the material containing compressive stresses and the material that does not contain compressive stresses are each chosen from alumina, mullite, silicon nitride, silicon carbide and titania.

16. A composite as in claim 8 in which the additional property affects threshold strength by controlling grain growth, changing the coefficient of thermal contraction, or changing the elastic modulus.

17. A composite as in claim 9 in which the material containing compressive stresses and the material that does not contain compressive stresses are each chosen from alumina, mullite, silicon nitride, silicon carbide, and titania.

18. A composite as in claim 9 in which the additional property enhances threshold strength by controlling grain growth, changing the coefficient of thermal contraction, or changing the elastic modulus.

19. A composite as in claim 11 in which the additional property enhances threshold strength by controlling grain growth, changing the coefficient of thermal contraction, or changing the elastic modulus.

20. A composite comprised of at least two materials that exhibits a threshold strength in which the materials are strongly bonded together;

residual, compressive stresses exist in only one of the materials;

the material containing the compressive stresses stops cracks extending from the material that does not contain the compressive stress at an applied tensile stress less than the threshold strength;

each material has a different chemical composition relative to the other;

the material that contains the compressive stresses possesses the smallest volume fraction in the composite;

the material containing compressive stresses separates and exists between the material that does not contain compressive stresses;

the dimension of material that does not contain compressive stresses, measured perpendicular to the interface between the material that does contain the compressive stress and the material that does not contain the compressive stress, is smaller than 1000 microns;

the dimension of material that does contain compressive stresses, measured perpendicular to the interface between the material that does contain the compressive stresses and the material that does not contain the compressive stresses is between 1 times and 0.001 times the dimension of the material that does not contain the compressive stresses;

the compressive stress is greater than 100 MPa; and prismatic cylinders of one material are separated and bonded to another material that contains residual compressive stresses, whereby at applied tensile stresses less than a threshold value, cracks that attempt to propagate from the prismatic cylinders into the material containing compressive stresses are stopped and cannot cause catastrophic failure.

21. A composite comprised of at least two materials that exhibits a threshold strength in which the materials are strongly bonded together;

residual, compressive stresses exist in only one of the materials;

the material containing the compressive stresses stops cracks extending from the material that does not contain the compressive stress at an applied tensile stress less than the threshold strength;

each material has a different chemical composition relative to the other;

the material that contains the compressive stresses possesses the smallest volume fraction in the composite;

the material containing compressive stresses separates and exists between the material that does not contain compressive stresses;

the dimension of material that does not contain compressive stresses, measured perpendicular to the interface between the material that does contain the compressive stress and the material that does not contain the compressive stress, is smaller than 1000 microns;

the dimension of material that does contain compressive stresses, measured perpendicular to the interface between the material that does contain the compressive stresses and the material that does not contain the compressive stresses is between 1 times and 0.001 times the dimension of the material that does not contain the compressive stresses;

the compressive stress is greater than 100 MPa; and polyhedra of one material are separated and bonded to another material that contains residual compressive stresses, whereby at applied tensile stresses less than a threshold value, cracks that attempt to propagate from the polyhedra into the material containing compressive stresses that surround the polyhedra are stopped and cannot cause catastrophic failure.

22. A composite comprised of at least two materials that exhibits a threshold strength in which the materials are strongly bonded together;

residual, compressive stresses exist in only one of the materials;

the material containing the compressive stresses stops cracks extending from the material that does not contain the compressive stress at an applied tensile stress less than the threshold strength;

each material has a different chemical composition relative to the other;

the material that contains the compressive stresses possesses the smallest volume fraction in the composite;

the material containing compressive stresses separates and exists between the material that does not contain compressive stresses;

the dimension of material that does not contain compressive stresses, measured perpendicular to the interface between the material that does contain the compressive stress and the material that does not contain the compressive stress, is smaller than 1000 microns;

the dimension of material that does contain compressive stresses, measured perpendicular to the interface between the material that does contain the compressive stresses and the material that does not contain the compressive stresses is between 1 times and 0.001 times the dimension of the material that does not contain the compressive stresses;

the compressive stress is greater than 100 MPa; and the compressive stresses arise during cooling from a processing temperature to room temperature, caused by the differential strain induced by the differential thermal contraction coefficients of the different materials used to form the composite, and in which the material containing compressive stresses and the material not containing compressive stresses are each a metal, where one metal has a lower thermal contraction coefficient relative to the other metal.

23. A composite comprised of at least two materials that exhibits a threshold strength in which the materials are strongly bonded together;

residual, compressive stresses exist in only one of the materials;

the material containing the compressive stresses stops cracks extending from the material that does not contain the compressive stress at an applied tensile stress less than the threshold strength;

each material has a different chemical composition relative to the other;

the material that contains the compressive stresses possesses the smallest volume fraction in the composite;

the material containing compressive stresses separates and exists between the material that does not contain compressive stresses;

the dimension of material that does not contain compressive stresses, measured perpendicular to the interface between the material that does contain the compressive stress and the material that does not contain the compressive stress, is smaller than 1000 microns;

the dimension of material that does contain compressive stresses, measured perpendicular to the interface between the material that does contain the compressive stresses and the material that does not contain the compressive stresses is between 1 times and 0.001 times the dimension of the material that does not contain the compressive stresses;

the compressive stress is greater than 100 MPa; and layers of one material are separated by alternating layers of the other material, all layers are bonded together; and one of the alternating materials contains biaxial, residual, compressive stresses, whereby at applied tensile stresses less than a threshold value, cracks that extend from a layer that does not contain compressive stresses into the compressive layers are stopped and cannot cause catastrophic failure; and the compressive stresses arise during cooling from a processing temperature to room temperature, caused by the differential strain induced by the differential thermal contraction coefficients of the different materials used to form the composite, the material containing compressive stresses and the material not containing compressive stresses being each a metal, where one metal has a lower thermal contraction coefficient relative to the other metal.

24. A composite comprised of at least two materials that exhibits a threshold strength in which the materials are strongly bonded together;

residual, compressive stresses exist in only one of the materials;

the material containing the compressive stresses stops cracks extending from the material that does not contain the compressive stress at an applied tensile stress less than the threshold strength;

each material has a different chemical composition relative to the other;

the material that contains the compressive stresses possesses the smallest volume fraction in the composite;

the material containing compressive stresses separates and exists between the material that does not contain compressive stresses;

the dimension of material that does not contain compressive stresses, measured perpendicular to the interface between the material that does contain the compressive stress and the material that does not contain the compressive stress, is smaller than 1000 microns;

the dimension of material that does contain compressive stresses, measured perpendicular to the interface between the material that does contain the compressive stresses and the material that does not contain the compressive stresses is between 1 times and 0.001 times the dimension of the material that does not contain the compressive stresses;

the compressive stress is greater than 100 MPa;

prismatic cylinders of one material are separated and bonded to another material that contains residual compressive stresses, whereby at applied tensile stresses less than a threshold value, cracks that attempt to propagate from the prismatic cylinders into the material containing compressive stresses are stopped and cannot cause catastrophic failure; and the compressive stresses arise during cooling from a processing temperature to room temperature, caused by the differential strain induced by the differential thermal contraction coefficients of the different materials used to form the composite, the material containing compressive stresses and the material not containing compressive stresses being each a metal, where one metal has a lower thermal contraction coefficient relative to the other metal.

25. A composite comprised of at least two materials that exhibits a threshold strength in which the materials are strongly bonded together;

residual, compressive stresses exist in only one of the materials;

the material containing the compressive stresses stops cracks extending from the material that does not contain the compressive stress at an applied tensile stress less than the threshold strength;

each material has a different chemical composition relative to the other;

the material that contains the compressive stresses possesses the smallest volume fraction in the composite;

the material containing compressive stresses separates and exists between the material that does not contain compressive stresses;

the dimension of material that does not contain compressive stresses, measured perpendicular to the interface between the material that does contain the compressive stress and the material that does not contain the compressive stress, is smaller than 1000 microns;

the dimension of material that does contain compressive stresses, measured perpendicular to the interface between the material that does contain the compressive stresses and the material that does not contain the compressive stresses is between 1 times and 0.001 times the dimension of the material that does not contain the compressive stresses;

the compressive stress is greater than 100 MPa; and a polyhedra of one material are separated and bonded to another material that contains residual compressive stresses, whereby at applied tensile stresses less than a threshold value, cracks that attempt to propagate from the polyhedra into the material containing compressive stresses that surround the polyhedra are stopped and cannot cause catastrophic failure; and the compressive stresses arise during cooling from a processing temperature to room temperature, caused by the differential strain induced by the differential thermal contraction coefficients of the different materials used to form the composite, the material containing compressive stresses and the material not containing compressive stresses being each a metal, where one metal has a lower thermal contraction coefficient relative to the other metal.

* * * * *